UNITED STATES PATENT OFFICE.

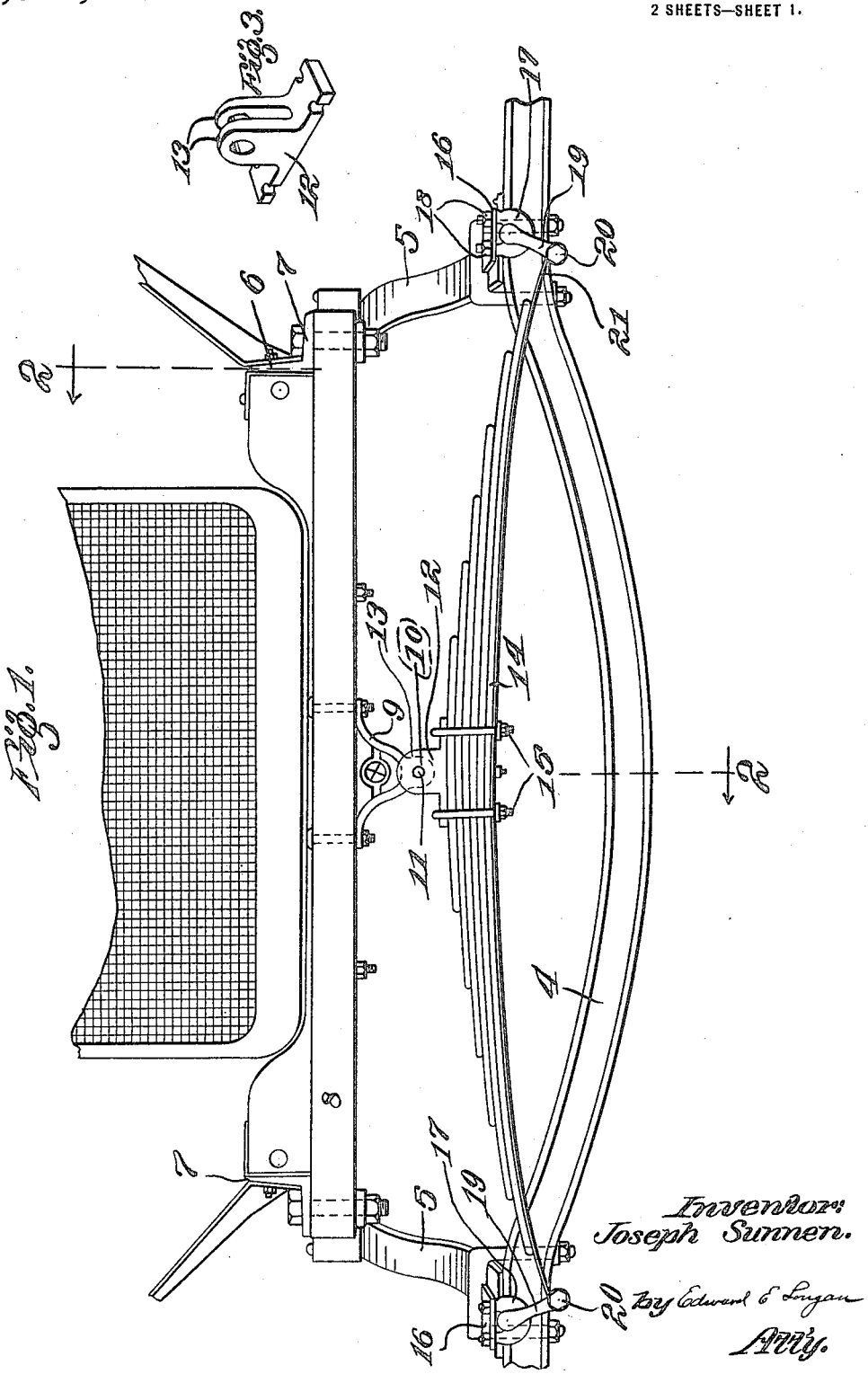

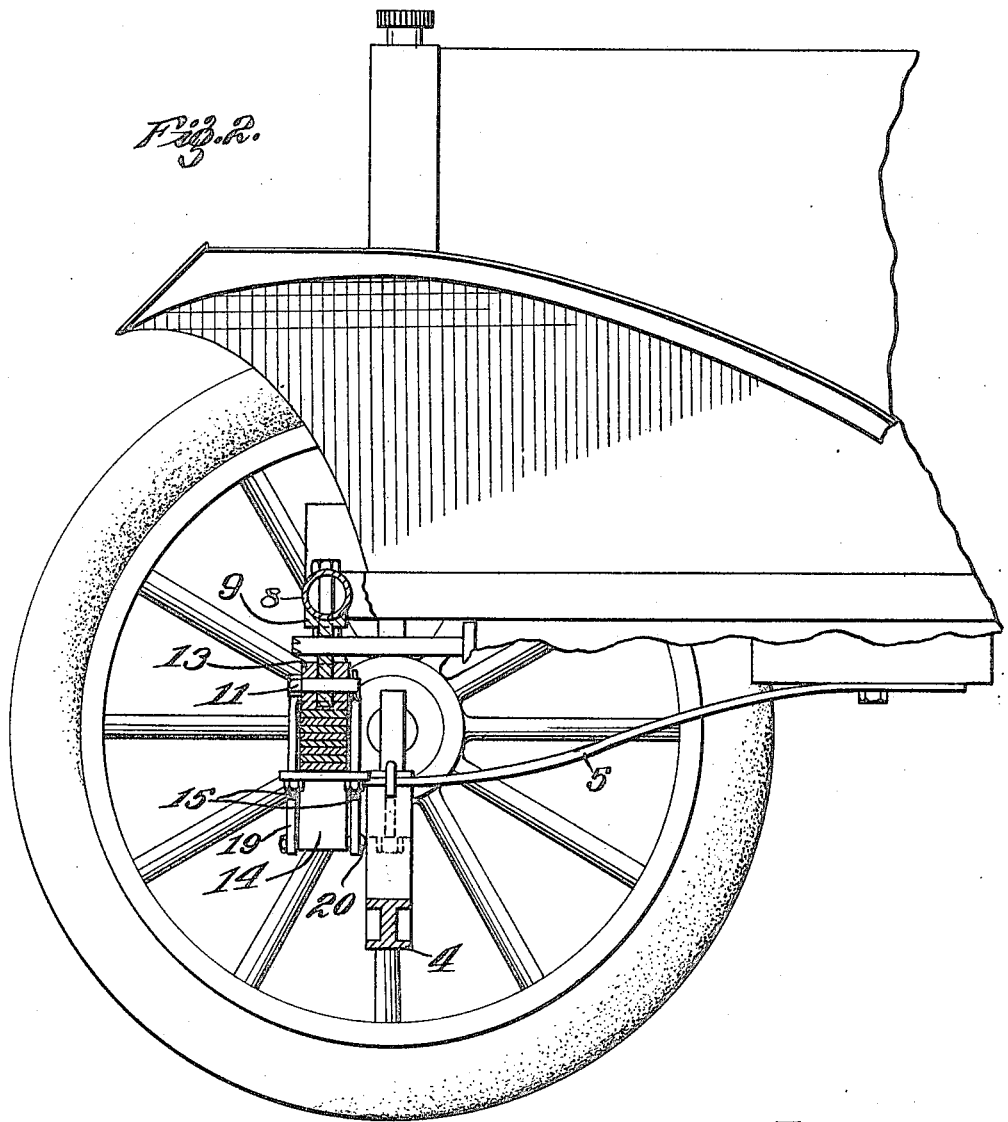

JOSEPH SUNNEN, OF MEXICO, MISSOURI.

SPRING SUSPENSION FOR AUTOMOBILES.

1,384,167.          Specification of Letters Patent.     Patented July 12, 1921.

Application filed January 26, 1920. Serial No. 353,914.

*To all whom it may concern:*

Be it known that I, JOSEPH SUNNEN, a citizen of the United States of America, and a resident of Mexico, in the county of Audrain and State of Missouri, have invented certain new and useful Improvements in a Spring Suspension for Automobiles, of which the following is a specification containing a full, clear, and exact description, reference being had to the accompanying drawings, forming a part thereof.

My invention relates to improvements in a spring suspension for automobiles, and has for its primary object a spring suspension applied to the front axle of an automobile, and is designed primarily for use on a car employing the cantaliver type of springs.

A further object is to construct a spring suspension for the front axle of an automobile utilizing the cantaliver spring so as to eliminate the road shocks transmitted from the wheels to the chassis, and at the same time acts as a distributer of road shocks imparted to one wheel so that the entire shock will not be absorbed by one side of the chassis only.

In the drawings, Figure 1 is a front view of my device, showing the same in position, Fig. 2 a sectional view taken on the line 2—2 of Fig. 1, and Fig. 3 a view of the swivel hanger by which the center of the spring is supported.

In the drawings, 4 represents the front axle of an automobile, 5 a single cantaliver spring by which the axle 4 is supported to the chassis 6. This chassis consists of the angle bars 7. To the under side of these angle bars is securely bolted a tube 8. This tube 8 has a U-shaped member or bracket 9 secured to the center thereof. This bracket is provided with a perforated ear 10 through which a pin or bolt 11 is inserted.

Swively secured to the bracket 9 by means of the bolt 11 is a hanger 12. This hanger is provided with a pair of perforated ears 13 which fit on either side of the perforated ear 10. Secured to the under side of the bracket or hanger 12 is a semi-elliptical spring 14, this spring being held to the hanger 12 by means of the clip bolts 15.

Secured to the axle 4 are plates 16 through which a U-shaped bolt 17 extends, this bolt being held to the plate 16 by means of nuts 18. Swively mounted in the U-shaped bolt 17 is a hanger 19, this being also U-shaped, and has a bolt 20 passing through its open ends. To this bolt and between the ends of the U-shaped hanger 19 the ends 21 of the spring 14 are secured. This swivel U-shaped bolt is necessary so as to allow the spring to bend when a road shock is imparted thereto.

As will be noted in the drawings, I have removed all but one leaf of the cantaliver spring 5. The only purpose this spring serves in connection with my device is to hold the front axle against twisting. By the use of the swivel or pivot at the center of the spring 14, the road shock is transferred from one end of the spring 14 to the other, thus giving greater flexibility in traveling over rough roads, as well as lessening the danger of breaking the spring.

While I have shown and described the spring as secured to the axle by a U-shaped bolt and plate, it is obvious that shackle bolts or in fact any other securing means may be used and accomplish the same purpose that the U-shaped bolt and plate does.

Having fully described my invention, what I claim is:—

1. An auxiliary spring for motor vehicles comprising in combination with the chassis and front axle thereof, of a semi-elliptical spring, U-shaped members carried by the axle, U-shaped members swivelly mounted therein, a semi-elliptic spring having its ends secured within the second U-shaped members and carried thereby, a tube carried by the chassis, a bracket carried by said tube, a second bracket swivelly secured to the last mentioned bracket and adapted to hold and support said spring, said spring being so arranged as to allow tilting and impart the road shock to both ends.

2. A spring suspension for the front end of an automobile and the like, comprising a chassis, a support carried by the front end of said chassis, a single semi-elliptic spring adapted to carry the entire load of the forward end, a pivotal connection between said support and said spring, a front axle located to the rear of said semi-elliptic spring, a cantaliver spring secured on each side of the chassis and to said front axle for preventing the twisting tendency of the axle, a U-shaped hanger secured to each end of the semi-elliptic spring and pivotally secured to the axle.

In testimony whereof, I have signed my name to this specification.

JOSEPH SUNNEN.